(No Model.)

D. MITCHELL.
NUT LOCK.

No. 597,119. Patented Jan. 11, 1898.

WITNESSES:
S. J. Nealy
J. A. Walsh

INVENTOR
Douglas Mitchell
BY
H. D. Nealy
ATTORNEY.

UNITED STATES PATENT OFFICE.

DOUGLAS MITCHELL, OF INDIANAPOLIS, INDIANA.

NUT-LOCK.

SPECIFICATION forming part of Letters Patent No. 597,119, dated January 11, 1898.

Application filed June 5, 1897. Serial No. 639,555. (No model.)

*To all whom it may concern:*

Be it known that I, DOUGLAS MITCHELL, a citizen of the United States, residing at Indianapolis, in the county of Marion and State of Indiana, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a nut-lock in which a split spring washer or ring performs the office of locking the nut, said washer having one of its ends turned to engage with the sides of the nut to hold and lock the same, the other end extending outward and forming a spring-base which prevents the ring or lock from turning.

In the accompanying drawings, where the same figures of reference refer to the same or similar parts, 1 represents a portion of a rail, and 2 the ordinary fish-plates, 3 being the bolt which holds the said fish-plates and rail together. The bolt is of ordinary form, as is also the nut 4, which may be either square or hexagonal, as desired.

Figure 1:
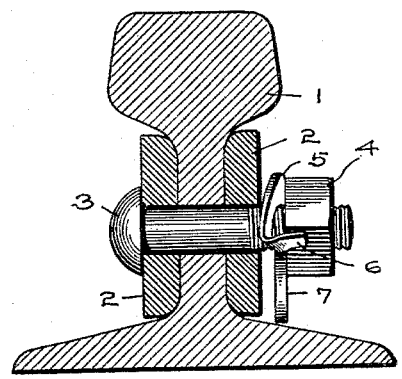
Figure 2:
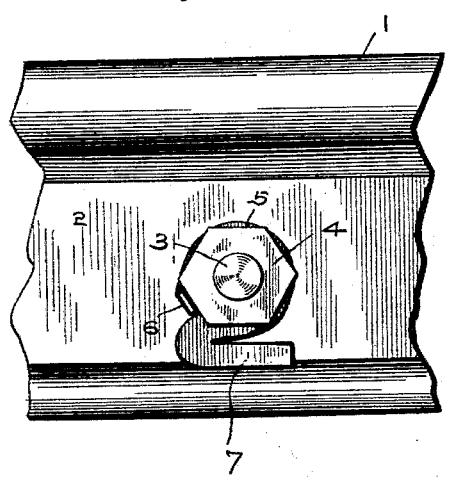
Figure 3:
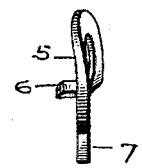
Figure 4:
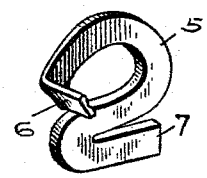

5 is the locking ring or washer and is shown separately in Figures 3 and 4, it being of such shape as to fit neatly on the bolt 3 between the fish-plate 2 and the nut 4. The ring or washer, while being preferably of stamped metal, is open or split at one side, and this split end is reduced in thickness and bent to form a spring or cushion between the nut and fish-plate. 6 is a turned end or point of the spring portion, which is adapted to engage with the nut 4 and lock the same, as hereinafter described. This turned end may be either plain, as shown in Figs. 1, 2, and 3, or may be notched, as shown in Fig. 4, so that it will lock the nut if at any time the corners of such nut should engage with the locking end or arm 6 when fully tightened. 7 is an extension of the other end of the ring 5, preferably at the bottom, and is shown so as to form to a certain extent a spring, which while bearing on the T of the rail and preventing the locking-ring from turning yet assists in removing some of the strain from the locking-point as the nut turns. If, however, it be desired, the extension 7 may be merely an enlargement of the ring 5 at its lower end—that is, be integral with it and having no spring.

It will be noticed by reference to Figs. 1, 3, and 4 that while the extension 7 and about half of the ring proper, 5, are of the same thickness the rest of the ring from a point diametrically opposite to where the extension 7 merges into the ring is gradually decreased in thickness until it reaches the locking point or end 6. It will also be noticed that this portion is bent or twisted to form a spring, this being made possible by the thinness of the metal in this part of the ring, while the lower portion is stiff enough to be rigid, except as hereinbefore noted.

The bolt 3 is passed through the rail and fish-plates or angles in the usual way, and my locking-ring is placed on the bolt 3 before putting on the nut 4, the lower edge of the extension 7 bearing on or lying against the T of the rail. As the nut is screwed on it will be apparent that the ring cannot turn as long as the extension 7 bears on the rail or any fixed point, and therefore the nut is readily screwed into place, the locking-point slipping over each corner of the nut and the spring of the extension 7 assisting to lessen the strain on the locking-point. At the same time, owing to the partial spiral form of that half of the ring nearest the locking-point, it will be seen that the farther the nut is screwed onto the bolt the greater the bearing of the locking-point on the nut, as the locking-point will be gradually turned in closer to the contacting face of the nut.

By notching the inner face of the locking-point it will make no difference whether the locking-point contacts with a corner of the nut or one of its faces it will lock the nut securely. At the same time it will be seen that when removing the nut the greatest difficulty will be at the start, for as the tension of the spring portion of the ring decreases the bearing of the locking-point will become less. This is also true in the reverse when screwing the nut on—namely, the farther on it is screwed the tighter it is locked.

Having fully described my invention, what

I claim as new, and desire to secure by Letters Patent of the United States, is—

1. A nut-lock having substantially a Z shape, the upper part of which is tapered or reduced in thickness and bent to form a spring or cushion between the nut and fish-plate, an outturned locking-point formed on the end of such reduced or spring portion of the lock, and constructed to engage this side of the nut, the lower portion of the lock forming a spring extension which contacts with the rail and prevents the lock from turning substantially as shown and described.

2. A nut-lock having substantially a Z shape, the upper part of which forms an open ring or washer and is tapered or reduced in thickness and bent to form a spring or cushion between the nut and fish-plate, an outturned locking-point formed on the end of the reduced or spring portion of the lock, said locking-point having a recess in its face so that the point will lock on either the flat sides or the corners of the nut, the lower portion of the lock forming a spring extension which contacts with the rail and prevents the lock from turning substantially as shown and described.

In testimony whereof I affix my signature in presence of two witnesses.

DOUGLAS MITCHELL.

Witnesses:
H. D. NEALY,
J. A. WALSH.